(12) United States Patent
Endo et al.

(10) Patent No.: US 8,297,704 B2
(45) Date of Patent: Oct. 30, 2012

(54) CONNECTOR FOR VEHICLE SEAT

(75) Inventors: Takayuki Endo, Toyota (JP); Hideki Uramichi, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 359 days.

(21) Appl. No.: 12/623,690

(22) Filed: Nov. 23, 2009

(65) Prior Publication Data
US 2010/0150645 A1 Jun. 17, 2010

(30) Foreign Application Priority Data
Dec. 11, 2008 (JP) ................................. 2008-315648

(51) Int. Cl.
*B60N 2/235* (2006.01)
(52) U.S. Cl. ................................. 297/367 L; 297/367 R
(58) Field of Classification Search ............... 297/367 L, 297/367 P, 367 R
See application file for complete search history.

(56) References Cited

U.S. PATENT DOCUMENTS

| | | | |
|---|---|---|---|
| 6,726,281 B2 * | 4/2004 | Baloche | 297/367 R |
| 6,991,295 B2 * | 1/2006 | Peters | 297/367 R |
| 7,100,987 B2 | 9/2006 | Volker et al. | |
| 7,341,311 B2 * | 3/2008 | Ohba | 297/367 R |
| 7,380,882 B2 * | 6/2008 | Oki | 297/367 R |
| 7,604,296 B2 * | 10/2009 | Yamada | 297/367 P |
| 2006/0055222 A1 * | 3/2006 | Bonk et al. | 297/367 |
| 2007/0145800 A1 * | 6/2007 | Thiel et al. | 297/367 |
| 2009/0250989 A1 | 10/2009 | Endo et al. | |
| 2009/0250990 A1 | 10/2009 | Endo et al. | |
| 2009/0256409 A1 | 10/2009 | Kuroda et al. | |
| 2010/0127546 A1 * | 5/2010 | Dziedzic | 297/367 R |

FOREIGN PATENT DOCUMENTS
JP  2006-204896  8/2006

OTHER PUBLICATIONS

English language Abstract of JP 2006-204896, Aug. 10, 2006.
German Office Action dated Feb. 1, 2012 with an English translation thereof.

* cited by examiner

*Primary Examiner* — Peter R. Brown
(74) *Attorney, Agent, or Firm* — Greenblum & Bernstein, P.L.C.

(57) ABSTRACT

A connector for a vehicle seat includes a ratchet, a guide, and engagement pieces. The engagement pieces are supported so as to be movable only in the radial direction of the guide, and prevent relative rotation between the ratchet and the guide when engaged with an inner peripheral toothed face of the ratchet. The inner peripheral toothed face is formed in the inner peripheral face of an annular wall that extends from the outer peripheral portion of a disc portion of the ratchet in its axial direction. The inner peripheral face is in contact with and supported by outer peripheral faces of guide walls that project in the axial direction from the inner disc face of the guide. Thus, the ratchet and the guide are coaxially fitted together so as to be rotatable relative to each other.

15 Claims, 14 Drawing Sheets

CONNECTOR FOR VEHICLE SEAT

INCORPORATION BY REFERENCE

The disclosure of Japanese Patent Application No. 2008-315648 filed on Dec. 11, 2008 including the specification, drawings and abstract is incorporated herein by reference in its entirety.

BACKGROUND OF THE INVENTION

1. Field of the Invention

The invention relates generally to a connector for a vehicle seat, and more specifically to a connector for a vehicle seat that is used to connect two connected members to each other in such a manner that one of the connected member is pivotable with respect to the other connected member.

2. Description of the Related Art

There is a vehicle seat in which a seatback is connected with a seat cushion via a reclining mechanism and the reclining angle of the seatback is adjustable. Examples of the structure of such a reclining mechanism include a structure in which a disc ratchet, which is connected integrally with a frame of a seatback, and a disc guide, which is connected integrally with a frame of a seat cushion, are coaxially fitted together in such a manner that the disc ratchet and the disc guide support each other and may rotate relative to each other.

More specifically, an annular wall is formed at the outer peripheral portion of the ratchet and an annular wall is formed at the outer peripheral portion of the guide. The annular walls are formed in such a manner that, when the inner disc faces of the ratchet and the guide face each other, the annular wall of the ratchet extends toward the guide and the annular wall of the guide extends toward the ratchet. One of the annular walls is placed on the outer periphery of the other annular wall, and these annular walls are fitted together. As a result, the ratchet and the guide are fitted together in such a manner that the ratchet and the guide support each other and may rotate relative to each other. Japanese Patent Application Publication No. 2006-204896 (JP-A-2006-204896) describes a structure of a reclining mechanism of the above-described type where an annular wall of a guide, which is to be fitted onto an annular wall of a ratchet, is omitted. With this structure, the reclining mechanism is downsized as a whole.

According to JP-A-2006-204896, in place of an annular wall of the guide, which is omitted, a thin cylindrical retaining ring is used. The retaining ring is a functional component that prevents the ratchet and the guide from being disconnected from each other in the axial direction and that is fitted so as to straddle the outer peripheral portions of the ratchet and the guide. The retaining ring rotatably supports the ratchet and the guide from the outer peripheral side.

However, in the technology described in JP-A-2006-204896, the retaining ring is formed of a relatively thin cylindrical member. Therefore, if a load that is sufficient to cause the ratchet and the guide to be non-coaxial is applied to the reclining mechanism, the retaining ring is easily bent.

SUMMARY OF THE INVENTION

The invention provides a structure with which two connection disc members, which are coaxially fitted together in such a manner that they are rotatable relative to each other, are more reliably prevented from being non-coaxial, in a connector that may prohibit a pivot motion of a connected member, for example, in a reclining mechanism for a vehicle seat.

An aspect of the invention relates to a connector for a vehicle seat used to connect a first connected member and a second connected member to each other in such a manner that the first connected member and the second connected member are pivotable with respect to each other. The connector includes a first connection disc member, a second connection disc member, and at least one lock member. The first connection disc member and the second connection disc member are connected integrally with the first connected member and the second connected member, respectively, and are coaxially fitted together in such a manner that the first connection disc member and the second connection disc member are rotatable with respect to each other. The lock member is arranged between the first connection disc member and the second connection disc member, is fitted to the first connection disc member and supported so as to be movable in the radial direction of the first connection disc member, and is moved outward in the radial direction so that an outer peripheral toothed face of the lock member meshes with an inner peripheral toothed face of the second connection disc member, thereby preventing relative rotation between the first connection disc member and the second connection disc member. The second connection disc member has a disc portion and an annular wall that is formed on the outer periphery of the disc portion, that extends in the axial direction of the second connection disc member, and that has an inner peripheral face in which the inner peripheral toothed face is formed. The first connection disc member has multiple annular-wall support portions that project from an inner disc face of the first connection disc member, which faces the second connection disc member, in the axial direction of the first connection disc member. The inner peripheral face of the annular wall of the second connection disc member is in contact with and supported by the annular-wall support portions.

According to the aspect of the invention described above, the inner peripheral face of the second connection disc member, in which the inner peripheral toothed face is formed, is in contact with and supported, from the inner peripheral side, by the annular-wall support portions that project from the inner disc face of the first connection disc member in the axial direction. In this state, the first connection disc member and the second connection disc member are fitted together in such a manner that they are rotatable relative to each other. With this structure, it is possible to prevent the two connection disc members from being non-coaxial without upsizing the connector.

In the aspect of the invention described above, the annular-wall support portions of the first connection disc member may be formed on both sides of a position, at which the lock member is arranged, in the circumferential direction.

In this structure, the annular-wall support portions, which are in contact with the inner peripheral toothed face of the second connection disc member, are formed on both sides of the position, at which the lock member of the first connection disc member is arranged, in the circumferential direction. Therefore, it is possible to arrange the annular-wall support portions at positions more proximal to the outer periphery of the first connection disc member without hindering the movements of the lock member to place the connector in the lock state or unlock state.

In the aspect of the invention described above, the annular-wall support portions may be formed of curved outer peripheral faces of block portions that are formed on respective sides of the lock member, that project from the inner disc face of the first connection disc member, and that support the lock member.

In this structure, the annular-wall support portions may be formed of curved outer peripheral faces of block portions. Therefore, it is possible to easily form the annular-wall support portions using the structure of the block portions.

BRIEF DESCRIPTION OF THE DRAWINGS

The features, advantages and technical and industrial significance of this invention will be described in the following detailed description of example embodiments of the invention with reference to the accompanying drawings, in which like numerals denote like elements, and wherein.

DETAILED DESCRIPTION OF THE EXAMPLE EMBODIMENTS

Figure 1:
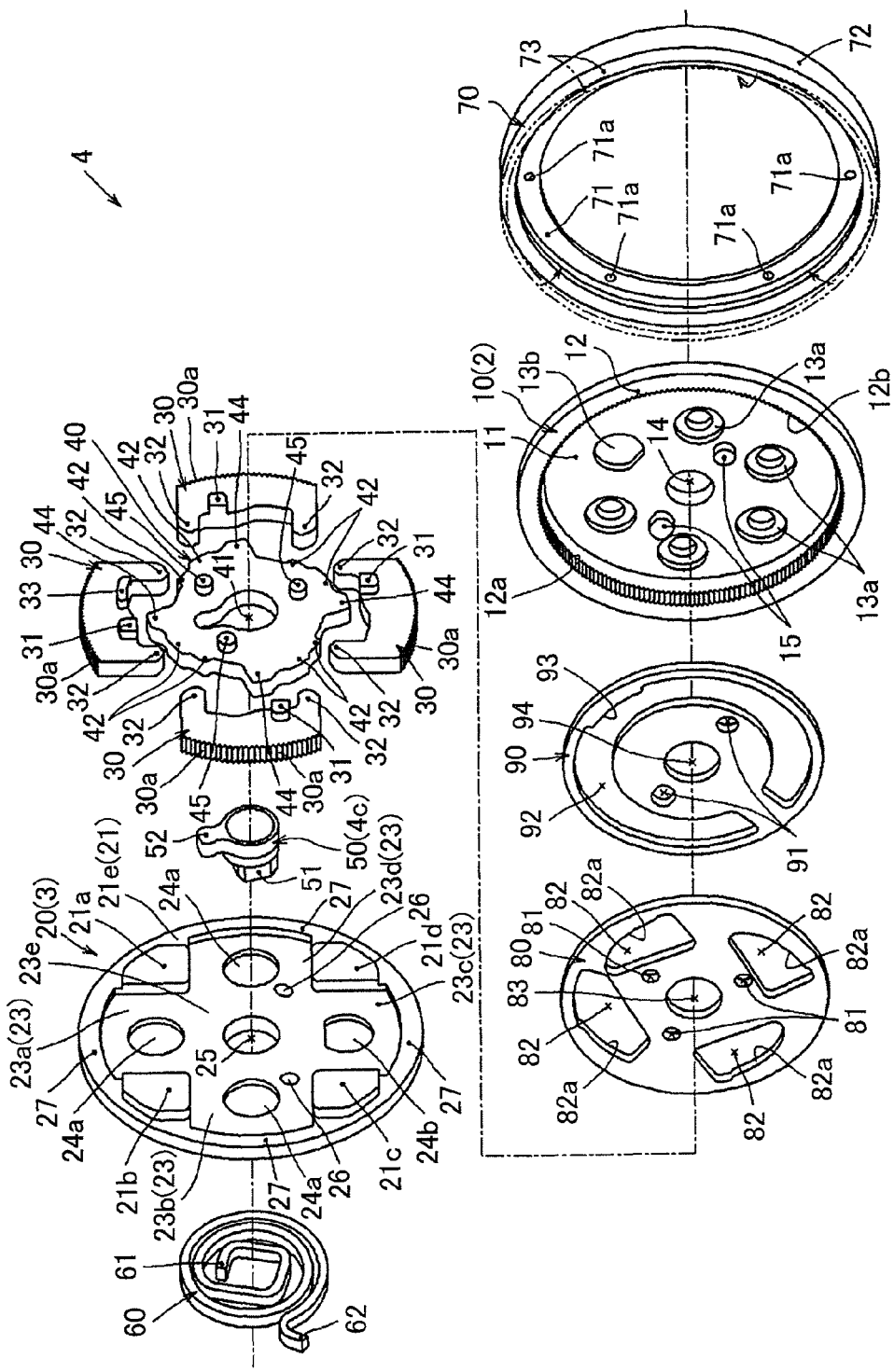
FIG. 1 is an exploded perspective view showing the structure of a reclining mechanism according to a first embodiment of the invention.

Hereafter, example embodiments of the invention will be described with reference to the accompanying drawings.

First, the structure of a connector for a vehicle seat according to a first embodiment of the invention will be described with reference to FIGS. 1 to 6. As shown in FIG. 2, the connector for a vehicle seat according to the first embodiment is employed in a vehicle seat 1 that is used as a front passenger seat for a right-hand drive vehicle. The connector for a vehicle seat according to the first embodiment is formed as a reclining mechanism 4 that connects a seatback 2, used as a backrest, to a seat cushion 3, used as a seating portion, in such a manner that the reclining angle of the backrest is adjustable.

The reclining mechanism 4 is provided on each of both side portions of the vehicle seat 1. The reclining mechanisms 4 are used as pivot shaft mechanisms that connect a right-side lower portion and a left-side lower portion of the seatback 2 to a right-side rear portion and a left-side rear portion of the seat cushion 3, respectively, in such a manner that the seatback 2 and the seat cushion 3 may pivot about the same axis, and that may prohibit the pivot motion of the seatback 2. With this structure, the seatback 2 may be switched between the state where the reclining angle of the seatback 2 with respect to the seat cushion 3 is fixed (pivot motion prohibited state) and the state where the reclining angle of the seatback 2 is adjustable (pivot motion allowed state) by switching the operation state of the reclining mechanisms 4.

The reclining mechanisms 4 are usually maintained in the lock state where the reclining mechanisms 4 fix the reclining angle of the seatback 2 with a biasing force. The reclining mechanisms 4 are brought out of the lock state at the same time when an operation of pulling up an operation lever 5, provided on the right side of the seat cushion 3 in FIG. 2 (on the left side of an occupant seated in the vehicle seat 1), is performed. The reclining mechanisms 4 are returned to the lock state by a biasing force when the operation of pulling up the operation lever 5 is cancelled.

More specifically, operation shafts 4c, used to switch the reclining mechanisms 4 between the lock state and the unlock state, pass through center portions of the reclining mechanisms 4. The operation shafts 4a are connected with each other via a rod 4r provided between the operation shafts 4c. When the right-side operation shaft 4c in FIG. 2 is rotated by the operation lever 5, the operation shafts 4c and the rod 4r are rotated together about their rotational axis.

The reclining mechanisms 4 are usually maintained in the lock state by a biasing force. When the operation shafts 4c are rotated at the same time by the operation of pulling up the operation lever 5, the reclining mechanisms 4 are brought out of the lock state at the same time. Thus, fixation of the reclining angle of the seatback 2 is cancelled. As a result, it is possible to adjust the reclining angle of the seatback 2.

When the reclining angle of the seatback 2 is adjusted to a desired reclining angle and then the operation for pulling up the operation lever 5 is cancelled, the reclining mechanisms 4 are returned to the lock state by a biasing force and the seatback 2 is locked at the adjusted reclining angle. The seatback 2 is always biased in such a direction that the seatback 2 pivots forward by a biasing force of a biasing spring (not shown) provided between and hooked to the seatback 2 and the seat cushion 3.

With this structure, when the reclining mechanisms 4 are brought out of the lock state, the seatback 2 is pivoted forward by a biasing force and placed on the upper face of the seat cushion 3. When the rotational angle of the reclining mechanisms 4 is within a range of angles at which the seatback 2 is usually used as the backrest, the reclining mechanisms 4 are returned to the lock state by a biasing force in response to cancellation of the operation of pulling up the operation lever 5.

However, the range of rotational angles of the reclining mechanisms 4 includes a range of lock zone angles at which the reclining mechanisms 4 are returned to the lock state by a biasing force if the operation for pulling up the operation lever 5 is cancelled, and a range of free zone angles at which the reclining mechanisms 4 are not returned to the lock state even if the operation of pulling up the operation lever 5 is cancelled. The range of lock zone angles is set to the range of rotational angles at which the seatback 2 is usually used as the backrest, more specifically, the rotational angle range between the rotational angle at which the seatback 2 stands upright and the rotational angle at which the seatback 2 is fully tilted, rearward.

The range of free zone angles is set to the range of rotational angles at which the seatback 2 is not used as the backrest, more specifically, the rotational angle range between the rotational angle at which the seatback 2 stands upright and the rotational angle at which the seatback 2 is fully tilted forward. Thus, when an operation for tilting the seatback 2 forward is performed, if the reclining mechanisms 4 are brought out of the lock state and the seatback 2 is tilted forward from the upright position even only slightly, the seatback 2 is automatically tilted forward to the position at which the seatback 2 is placed on the upper face of the seat cushion 3 even if the operation for pulling up the operation lever 5 is cancelled.

The structure of the reclining mechanisms 4 will be described below in detail. The reclining mechanisms 4 have the bilaterally symmetric structures, and have substantially the same structure. Therefore, only the structure of the right-side reclining mechanism 4 in FIG. 2 will be described below.

Figure 2:
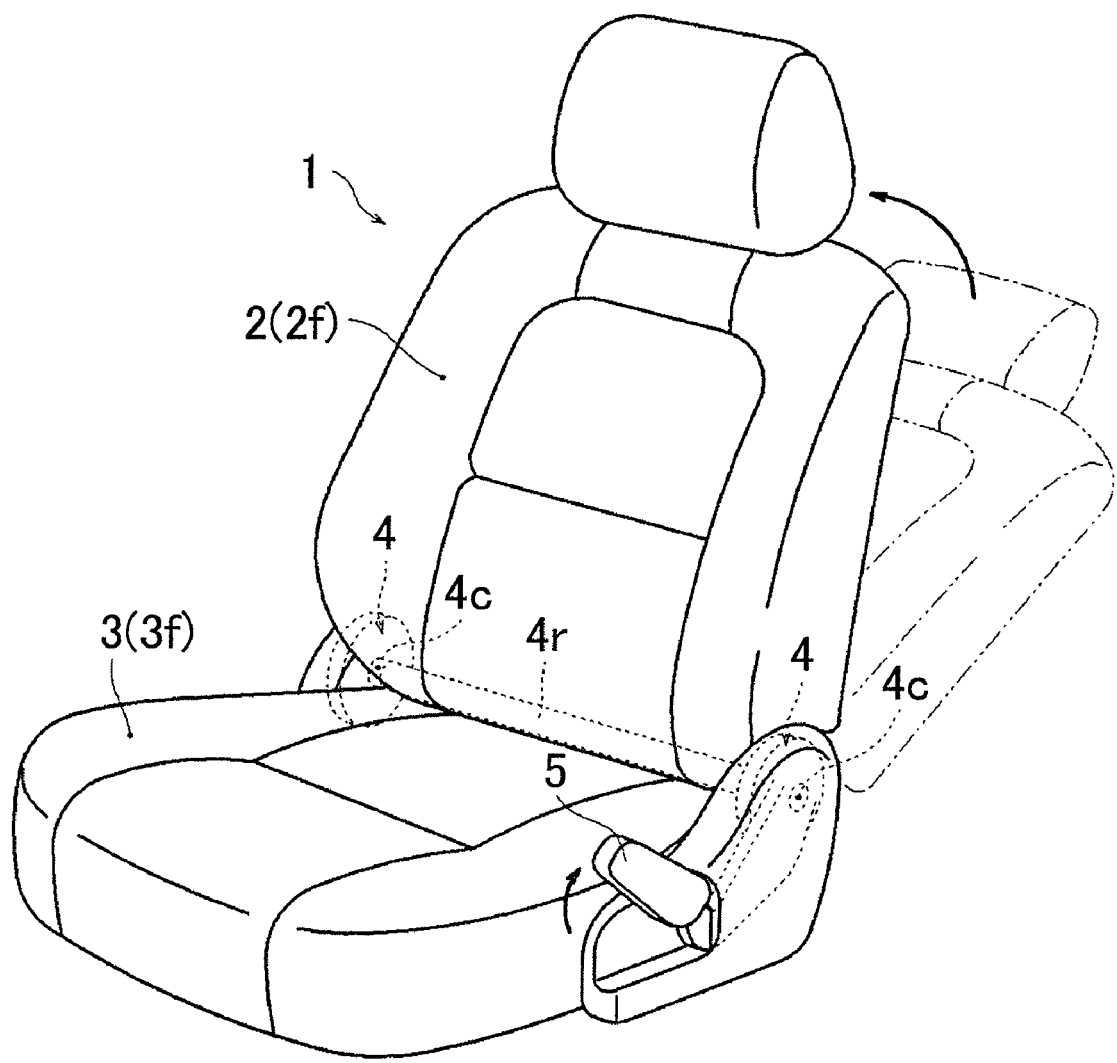
FIG. 2 is a perspective view schematically showing the structure of a vehicle seat.

FIG. 1 is an exploded perspective view of the reclining mechanism 4. The reclining mechanism 4 includes a ratchet 10, a guide 20, four engagement pieces 30, a rotating cam 40, a hinge cam 50, a spiral spring 60, a retaining ring 70, a release plate 80, and a free zone plate 90. These components are assembled into the reclining mechanism 4. In FIG. 1, the ratchet 10 and the guide 20 are arranged in such a manner the fitting faces, at which the ratchet 10 and the guide 20 are fitted to each other, are shown. In this way, the configurations of the inner disc faces of the ratchet 10 and the guide 20 are clearly shown.

The guide 20 may function as a first connection disc member according to the invention, the ratchet 10 may function as a second connection disc member according to the invention, and the engagement pieces 30 may function as lock members according to the invention. More specifically, the ratchet 10 is formed in disc shape, and an annular wall 12 is formed on the outer periphery of a disc portion 11 of the ratchet 10. The annular wall 12 extends in the thickness direction of the ratchet 10 toward the guide 20 when the ratchet 10 faces the guide 20. The annular wall 12 is formed by pressing the perimeter portion of the disc portion 11 in the thickness direction through a half blanking process.

Figure 3:
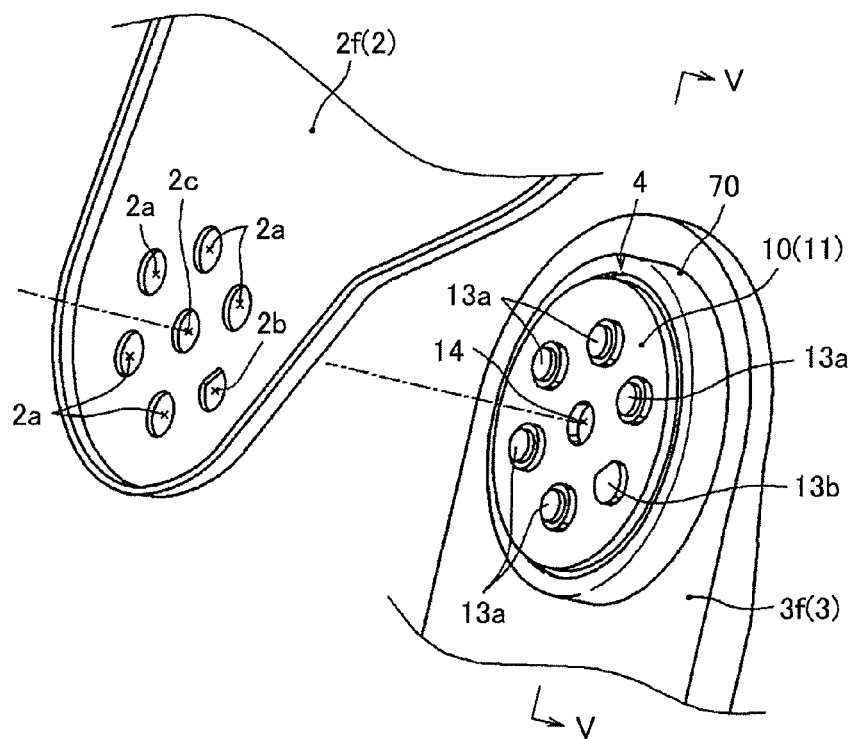
FIG. 3 is a perspective view showing the structure for fitting the reclining mechanism to a seatback.

An inner peripheral toothed face 12a that has internal teeth, with which external teeth of outer peripheral toothed faces 30a of the engagement pieces 30, described later in detail, may be meshed, is formed in the whole circumference region of the inner peripheral face of the annular wall 12. As shown in FIG. 3, when the outer disc face of the disc portion 11 of the ratchet 10 is fitted to the plate face of a back frame 2f that forms the frame of the seatback 2, the ratchet 10 is connected with the seatback 2. The back frame 2f may function as a second connected member according to the invention.

More specific description will be provided below. Multiple dowels 13a and a D-dowel 13b, which project from the outer disc face of the disc portion 11, are formed on the disc portion 11 of the ratchet 10. The dowels 13a and the D-dowel 13b are formed at positions, which are relatively close to the outer periphery of the disc portion 11, and which are at regular intervals in the circumferential direction. Each dowel 13a is a cylindrical member having a circular cross section. The cross section of D-dowel 13b is in a D-shape. Therefore, the D-dowel 13b is distinguishable from the dowels 13a based on the shape.

Multiple dowel though-holes 2a and a D-dowel though-hole 2b, in which the dowels 13a and the D-dowel 13b may be fitted, are formed in the back frame 2f. Therefore, when the dowels 13a and the D-dowel 13b are fitted in the dowel though-holes 2a and the D-dowel though-hole 2b formed in the back frame 2f and fit portions of the dowels are welded to the back frame 2f, the ratchet 10 is firmly and integrally connected with the back frame 2f (see FIG. 8).

A through-hole 14, through which the operation shaft 4c (see FIG. 2) used to switch the reclining mechanism 4 between the lock state and the unlock state passes, is formed in the center portion of the disc portion 11 of the ratchet 10. A through-hole 2c, through which the operation shaft 4c passes, is formed in the back frame 2f. The through-hole 2c and the through-hole 14 are on the same axis line.

Figure 8:
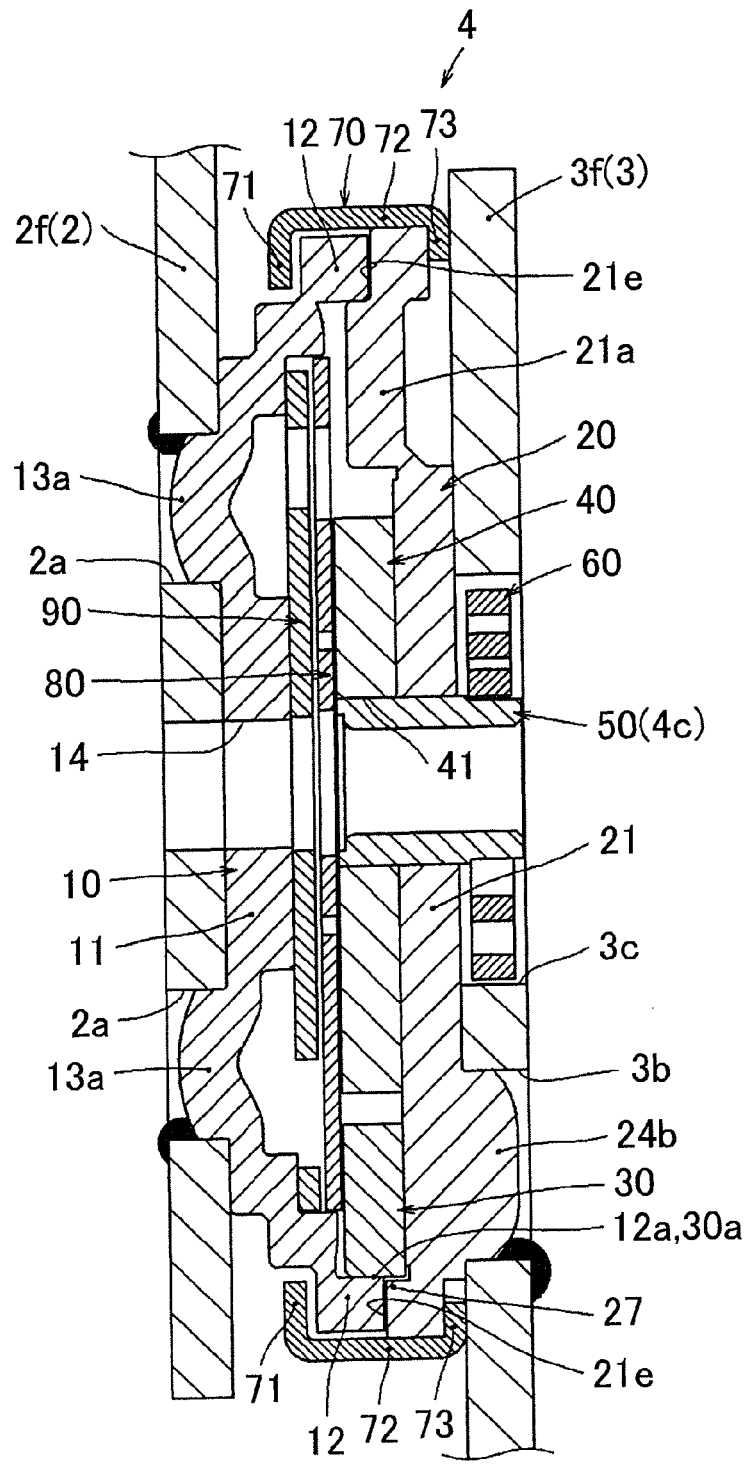
FIG. 8 is a cross-sectional view taken along the line VIII-VIII in FIG. 5.

Next, the structure of the guide 20 will be described with reference to FIG. 1. As shown in FIG. 8, the guide 20 is a disc member having substantially the same outer diameter as that of the ratchet 10. When the above-described annular wall 12 of the ratchet 10 is arranged so as to contact a set face 21e formed on the perimeter portion of the inner disc face of the guide 20 in such a manner that the guide 20 and the ratchet 20 are coaxial with each other, the guide 20 and the ratchet 10 are fitted together in such a manner that the ratchet 10 and the guide 20 may rotate relative to each other.

Figure 5:
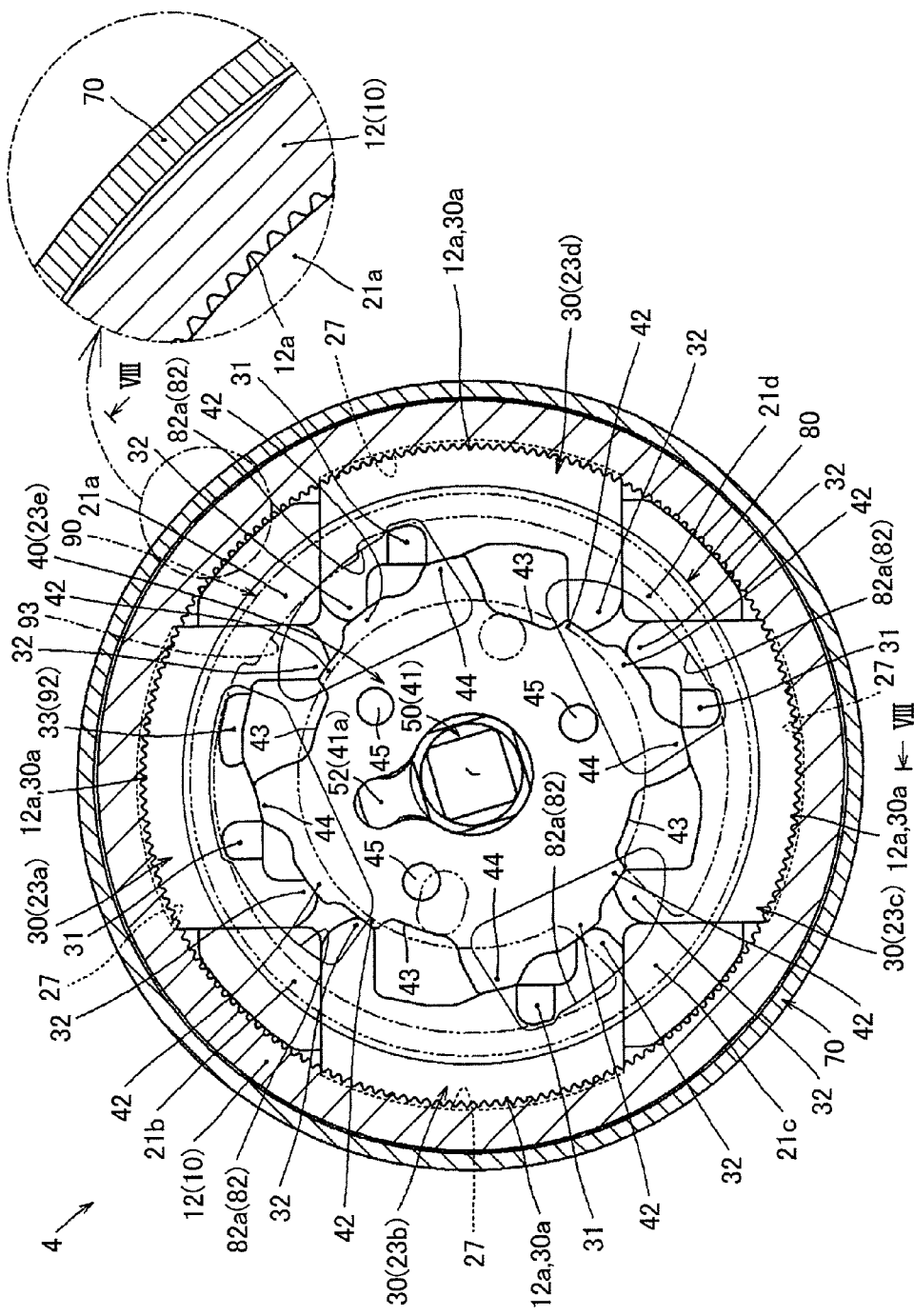
FIG. 5 is a cross-sectional view taken along the line V-V in FIG. 3, showing the reclining mechanism in the lock state.
Figure 6:
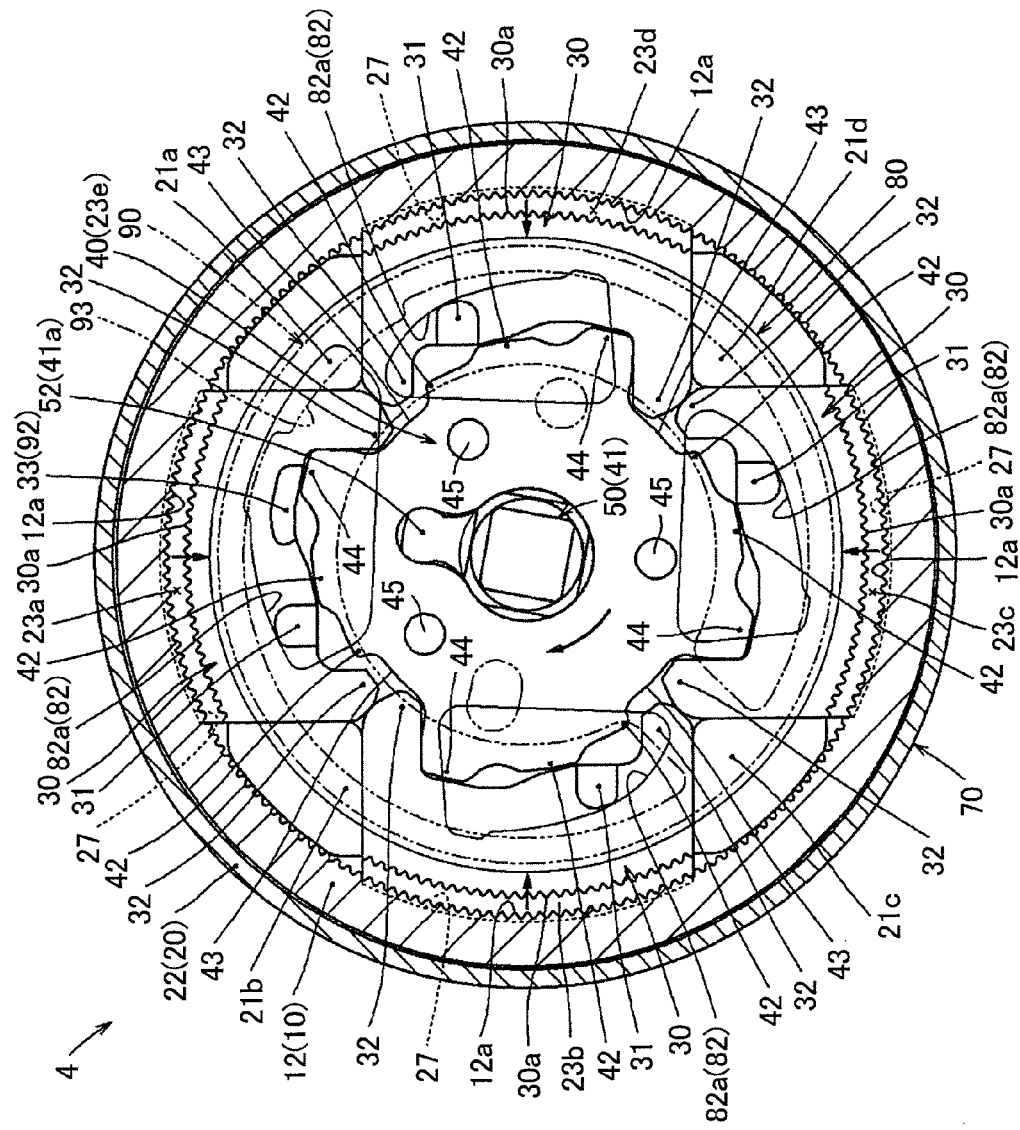
FIG. 6 is a cross-sectional view showing the reclining mechanism that has been shifted to the unlock state from the lock state in FIG. 5.

More specifically, when the annular wall 12 of the ratchet 10 is arranged so as to contact the set face 21e of the guide 20 in such a manner that the ratchet 10 and the guide 20 are coaxial with each other, the annular wall 12 is in contact with and supported by the outer peripheral faces of guide blocks 21a, 21b, 21c and 21d (hereafter, referred to as "guide blocks 21a to 21d") that are formed so as to project from the inner disc face of the guide 20, as shown in FIGS. 5 and 6. In this way, the annular wall 12 is supported from the inner peripheral side at four positions that are apart from each other in the circumferential direction. Thus, the ratchet 10 and the guide 20 are fitted together in such a manner that the ratchet 10 and the guide 20 may rotate relative to each other. The guide blocks 21a to 21d will be described later in detail.

Figure 4:
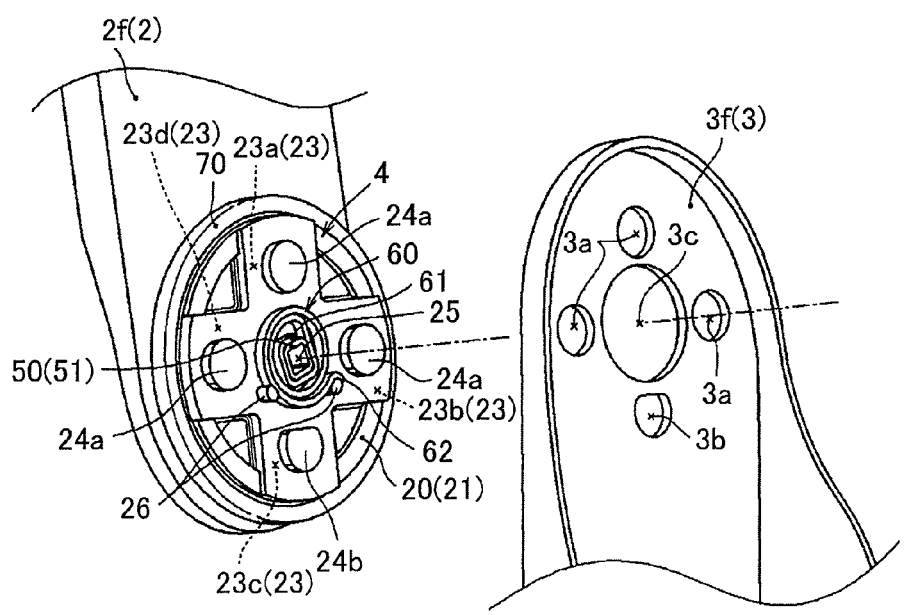
FIG. 4 is a perspective view showing the structure for fitting the reclining mechanism to a seat cushion.

As shown in FIG. 4, when the outer disc face of a disc portion 21 of the guide 20 is fitted to the plate face of a cushion frame 3f that forms the frame of the seat cushion 3, the guide 20 is connected with the seat cushion 3. The cushion frame 3f may function as a first connected member according to the invention.

Multiple dowels 24a and a D-dowel 24b, which project from the outer disc face of the disc portion 21, are formed on the disc portion 21 of the guide 20. The dowels 24a and the D-dowel 24b are formed at positions relatively which are relatively close to the outer periphery of the disc portion 21, and which are at regular intervals in the circumferential direction. Each dowel 24a is a cylindrical member having a circular cross section. The cross section of D-dowel 24b is in a D-shape. Therefore, the D-dowel 24b is distinguishable from the dowels 24a based on the shape.

Multiple dowel though-holes 3a and a D-dowel though-hole 3b, in which the dowels 24a and the D-dowel 24b may be fitted, are formed in the cushion frame 3f. Therefore, when the dowels 24a and the D-dowel 24b are fitted in the dowel though-holes 3a and the D-dowel though-hole 3b formed in the cushion frame 3f, respectively, and fit portions of the dowels are welded to the cushion frame 3f, the guide 20 is firmly and integrally connected with the cushion frame 3f (see FIG. 8).

A through-hole 25, through which the operation shaft 4c (see FIG. 2) used to switch the reclining mechanism 4 between the lock state and the unlock state passes, is formed in the center portion of the disc portion 21 of the ratchet guide 20. A through-hole 3c, through which the operation shaft 4c passes, is formed in the cushion frame 3f. The through-hole 3c and the through-hole 25 are on the same axis line. The through-hole 3c is large enough to fit the spiral spring 60, described later in detail, therein.

Referring again to FIG. 1, the disc portion 21 of the guide 20 has a cross-shaped guide recess 23, which is formed by recessing the inner disc face of the disc portion 21 in the thickness direction of the guide 20. The guide recess 23 is formed by pressing a portion of the disc portion 21 in a cross shape in the thickness direction through a half blanking process. The dowels 24a and the D-dowel 24b are formed so as to project from the outer disc face of the portion in which the guide recess 23 is formed.

The guide recess 23 has four recessed portions two of which extend in the up-down direction and the other two of which extend in the lateral direction in FIG. 1. The four recessed portions are formed as engagement piece recesses 23a, 23b, 23c and 23d (hereinafter, referred to as "engagement piece recesses 23a to 23d") in which the engagement pieces 30 are arranged. As shown in FIGS. 5 and 6, the guide block 21a is formed between the engagement piece recesses 23a and 23d, the guide block 21b is formed between the engagement piece recesses 23a and 23b, the guide block 21c is formed between the engagement piece recesses 23b and 23c, and the guide recess 21d is formed between the engagement piece recesses 23c and 23d in the circumferential direction. The guide blocks 21a to 21d contact and support the engagement pieces 30 arranged in the engagement piece recesses 23a to 23d in such a manner that the engagement pieces 30 are slidable only inward and outward in the radial direction and immovable in the circumferential direction. The guide blocks 21a to 21d may function as block portions according to the invention.

A recessed portion that is formed at the center portion of the guide recess 23 is used as a cam recess 23e in which the rotating cam 40, described later in detail, is arranged. The cam recess 23e is large enough so that the rotating cam 40 is allowed to rotate therein. Referring again to FIG. 1, the disc portion 21 of the guide 20 has spring hooking portions 26 that are in pin-shape and that project from two positions of the outer disc face of the disc portion 21. The spring hooking portions 26 are functional components to which an outer end 62 of the spiral spring 60, described later in detail, is hooked. The spring hooking portions 26 are formed at two positions that are apart from each other in the circumferential direction so that the position at which the spiral spring 60 is hooked is selectable.

Next, the structure of the above-described four engagement pieces 30 will be described. When the engagement pieces 30 are placed in the above-described engagement piece recesses 23a to 23d formed in the guide 20, the engagement pieces 30 are supported in such a manner that the engagement pieces 30 are allowed to move only outward and inward in the radial direction along the engagement piece recesses 23a to 23d and are not allowed to move in the circumferential direction. The outer peripheral faces of the engagement pieces 30, which are the outer peripheral faces in the radial direction, are formed as the outer peripheral toothed faces 30a that are curved in accordance with the inner peripheral face of the annular wall 12 and that have external teeth, which may be meshed with the internal teeth of the inner peripheral toothed face 12a of the annular wall 12 of the above-described ratchet 10.

As shown in FIG. 5, when the thus structured engagement pieces 30 are pushed by the rotating cam 40, described later in detail, outward in the radial direction, the outer peripheral toothed faces 30a of the engagement pieces 30 are meshed with the inner peripheral toothed face 12a of the annular wall 12 of the ratchet 10. Thus, the engagement pieces 30 are meshed with and pushed against the ratchet 10 by a pushing force of the rotating cam 40. As a result, the engagement pieces 30 are maintained in the state where the engagement pieces 30 are not allowed to move relative to the ratchet 10 in the rotational direction (circumferential direction) and the radial direction.

The engagement pieces 30 are supported by the guide blocks 21a to 21d so that the engagement pieces 30 are allowed to move relative to the guide 20 only inward and outward in the radial direction and are not allowed to move relative to the guide 20 in the circumferential direction. Therefore, the ratchet 10 is maintained in the state where the ratchet 10 is prohibited to rotate relative to the guide 20 via the engagement pieces 30 meshed with the ratchet 10. As a result, the reclining mechanism 4 is placed in the lock state where the reclining mechanism 4 is prohibited to rotate.

As shown in FIG. 6, the reclining mechanism 4 is brought out of the lock state when the rotating cam 40 is rotated in the clockwise direction in FIG. 6 and the engagement pieces 30 are moved inward in the radial direction and disengaged from the ratchet 10. The engagement, pieces 30 are moved outward and inward in the radial direction by the rotation of the rotating cam 40. The inward movement and the outward movement of the engagement pieces 30 in the radial direction are caused by shoulder portion 42, corner portions 44 that are formed in the outer peripheral portion of the rotating cam 40 and the release plate 80 that is fitted to the rotating cam 40.

More specifically, the shoulder portions 42 and the corner portions 44 that project outward in the radial direction are formed in the outer peripheral portion of the rotating cam 40 at multiple positions in the circumferential direction of the rotating cam 40. The shoulder portions 42 pushes leg portions 32 of the engagement pieces 30 from the inner side in accordance with the rotation of the rotating cam 40. In accordance with the rotation of the rotating cam 40, the corner portions 44 pushes the inner peripheral faces of the engagement pieces 30 that define the recesses of the engagement pieces 30 from the inner side. Thus, in accordance with the rotation of the rotating cam 40, each engagement piece 30 is pushed from the inner peripheral side at three positions by the shoulder portions 42 and the corner portion 44 of the rotating cam 40. As a result, the engagement pieces 30 are pushed outward in the radial direction.

The release plate 80 is fitted to the above-described rotating cam 40. The release plate 80 is hooked over hooking portions 31 that project from the engagement pieces 30. In accordance with the rotation of the rotating cam 40, the release plate 80 guides the engagement pieces 30 inward in the radial direction. The release plate 80 is a thin disc member. When fitting projections 45 formed on the rotating cam 40 so as to project in the axial direction are fitted in three fitting through-holes 80 that are formed in the disc portion of the release plate 80, the release plate 80 is fitted to the rotating cam 40 in such a manner that release plate 80 rotates together with the rotating cam 40 in the same rotational direction.

Operation orifices 82 are formed in the release plate 80 at four positions that are apart from each other in the circumferential direction. The hooking portions 31 that project from the engagement pieces 30 are fitted in the operation orifices 82. When the release plate 80 rotates together with the rotating cam 40, the engagement pieces 30 are guided inward in the radial direction. The radially-outer side peripheral face that defines the operation orifice 82 is an operation face 82 that is sloped inward in the radial direction in such a manner that the distance between the operation face 82 and the center of the release plate 80 is shortest at the end of the operation face 82 in the counterclockwise direction in FIG. 1.

The operation faces 82a contact the outer peripheral faces of the hooking portions 31 of the engagement pieces 30. As shown in FIG. 6, when the release plate 80 is rotated together with the rotating cam 40 from the position in FIG. 5 in the clockwise direction as shown in FIG. 6, the engagement pieces 30 are guided inward in the radial direction by the sloped operation faces 82a. In accordance with the rotation of the rotating cam 40, the leg portions 32 of the engagement pieces 30, which are guided inward in the radial direction, enter recesses 43 that are recesses formed in the outer peripheral portion of the rotating cam 40. In this way, the engagement pieces 30 are allowed to move inward in the radial direction.

A through-hole 83, through which the operation shaft 4c (see FIG. 2) used to switch the reclining mechanism 4 between the lock state and the unlock state passes, is formed at the center portion of the release plate 80.

As shown in FIG. 5, the rotating cam 40 structured as described above is usually biased in the counterclockwise direction via the hinge cam 50 that is fitted at the center portion of the rotating cam 40. In this case, the rotating cam 40 is maintained in the state in which the leg portions 32 of the engagement pieces 30 strand the shoulder portions 42 and the inner peripheral faces of the engagement pieces 30 are pushed by the corner portions 44 so that the outer peripheral toothed faces 30a of the engagement pieces 30 are pushed against and meshed with the inner peripheral toothed face 12a of the ratchet 10.

As shown in FIG. 6, when the hinge cam 50 is rotated in the clockwise direction against the biasing force, the rotating cam 40 is rotated in the clockwise direction. Thus, the rotating cam 40 moves the engagement pieces 30 inward in the radial direction via the release plate 80 to disengage the engagement pieces 30 from the ratchet 10. Next, the structure of the hinge cam 50 that is used to rotate the rotating cam 40 will be described.

As shown in FIG. 1, the hinge cam 50 is fitted in the through-hole 25 formed in the guide 20 so as to be rotatably supported by the guide 20. An operation projection 52 formed on the outer periphery of the hinge cam 50 is fitted in an operation hole 41a that is a recess formed in the peripheral face that defines the through-hole 41 formed at the center portion of the rotating cam 40. The hinge cam 50 is usually biased in the counterclockwise direction in FIG. 1 by a biasing force of the spiral spring 60 that is provided between and hooked to the guide 20 and the hinge cam 50. In this state, the hinge cam 50 supplies, via the operation projection 52, the rotating cam 40 with a rotational biasing force in the counterclockwise direction.

As shown in FIG. 4, the spiral spring 60 that applies a rotational biasing force to the hinge cam 50 is arranged in a spiral fashion between the hinge cam 50 and the guide 20. An inner end 61 of the spiral spring 60 is hooked to a spring hooking portion 51 of the hinge cam 50, and the outer end 62 of the spiral spring 60 is hooked to the hooking portion 26 of the guide 20. The operation shaft 4c described above with reference to FIG. 2 is inserted into the hinge cam 50 in the axial direction so as to rotate together in the same rotational direction. With this structure, when the operation lever 5 (see FIG. 2) is puller up, the hinge cam 50 is rotated in the clockwise direction against a biasing force of the spiral spring 60 shown in FIG. 1.

Referring again to FIG. 1, the retaining ring 70 will be described. The retaining ring 70 is a cylindrical member. The retaining ring 70 is formed by stamping a thin steel plate into an annular shape and pressing the plate in the axial direction through a half blanking process. Thus, a flange 71 that extends in the radial direction is formed at one end of the retaining ring 70. When the ratchet 10 is fitted in the retaining ring 70, the flange 71 faces the outer disc face of the annular wall 12 of the ratchet 10 in the axial direction, as shown in FIG. 8.

When the ratchet 10 is fitted in the retaining ring 70, the outer disc face of the annular wall 12 of the ratchet 10 projections 71a that project from the inner disc face of the flange 71. The position of the ratchet 10 with respect to the retaining ring 70 in the axial direction is set to the positions at which the ratchet 10 contacts the projections 71a. Then, when the guide 20 is fitted in the retaining ring 70, the guide 20 and the ratchet 10 are fitted together in such a manner that the outer peripheral portions thereof are covered by an annular wall 72 of the retaining ring 70 from the outer peripheral side.

In this state, the end portion (bent face portion 73) of the annular wall 72, which projects from the outer disc face of the guide 20 is bent inward in the radial direction through a swaging process. Thus, the bent face portion 73 is connected integrally with the guide 20. In this way, the ratchet 10 and the guide 20 are fitted together and prevented from being disconnected from each other in the axial direction by the retaining ring 70.

As shown in FIG. 8, the ratchet 10 and the guide 20 are fitted together with various components such as the engagement pieces 30 and the rotating cam 40 disposed therebetween. When the ratchet 10 and the guide 20 are fitted together, the annular wall 12 of the ratchet 10 contacts the set face 21e of the guide 20 and a small space is left between the annular wall 12 and the flange 71 of the retaining ring 70. With this structure, the ratchet 10 is allowed to rotate relative to the guide 20 smoothly without being hindered by a friction that may be caused between the ratchet 10 and the retaining ring 70.

Referring again to FIG. 1, the free zone plate 90, which is a thin disc member, is fitted to the ratchet 10. A through-hole 94, through which the operation shaft 4c (see FIG. 2) used to switch the reclining mechanism 4 between the lock state and the unlock state passes, is formed at the center portion of the free zone plate 90. When fitting projections 15, which project from the inner disc face of the ratchet 10, are fitted in fitting holes 91, which are formed at two positions of the disc portion of the free zone plate 90, the free zone plate 90 is fitted to the ratchet 10 in such a manner that the free zone plate 90 rotates together with the ratchet 10 in the same rotational direction.

An arc-shaped movement-allowing hole 92, which continuously extends in the circumferential direction of the free zone plate 90, is formed in the free zone plate 90 at a position near the outer periphery of the free zone plate 90. A projection 33 that projects from the upper engagement piece 30 (the engagement piece 30 that is placed in the engagement piece recess 23a) in FIG. 1 is fitted in the movement-allowing hole 92. The movement-allowing hole 92 is large enough so that the upper engagement piece 30 is allowed to move outward in the radial direction when the upper engagement piece 30 is pushed by the rotating cam 40.

A strand face 93, which projects inward in the radial direction from the outer-side peripheral face that defines the movement-allowing hole 92, is formed in a part of the outer-side peripheral face. As shown in FIG. 6, due to the rotation of the free zone plate 90 together with the ratchet 10, the position of the strand face 93 in the circumferential direction is set to the position, which is in such a direction that the upper engagement piece 30 (the engagement piece 30 that is placed in the engagement piece recess 23a) is moved to place the reclining mechanism 4 in the lock state. Thus, the strand face 93 contacts the projection 33 so that the movement of the upper engagement piece 30 that may place the reclining mechanism 4 in the lock state is prevented.

More specifically, when the upper engagement piece 30 is moved so as to place the reclining mechanism 4 in the lock state, the strand face 93 contacts the projection 33 before the outer peripheral toothed face 30a of the engagement piece 30 meshes with the inner peripheral toothed face 12a of the ratchet 10. Thus, the engagement piece 30 is prevented from being further moved outward in the radial direction and the reclining mechanism 4 is prevented from being placed in the lock state. Because the above-described engagement piece 30 is prevented from being moved so as to place the reclining mechanism 4 in the lock state, the rotation of the rotating cam 40 that applies a pushing force to the engagement piece 30 to move the engagement piece 30 outward in the radial direction is also prevented. Thus, the other engagement pieces 30 are prevented from being moved so as to place the reclining mechanism 4 in the lock state. As a result, the reclining mechanism 4 is maintained in the unlock state.

Within the range of rotational angles at which the strand face 93 formed in the free zone plate 90 contacts the projection 33 of the upper engagement piece 30, the reclining mechanism 4 is prevented from being placed in the lock state and maintained in the unlock state. The above-described range of free zone angles is set to this range of rotational angles. Referring again to FIG. 1, the guide 20 has retaining wall portions 27 that project from the bottom faces of the engagement piece recesses 23a to 23d in the axial direction, and that are formed in the perimeter portion of the guide 20 at positions on the radially outer side of the engagement piece recesses 23a to 23d.

The inner faces of the retaining wall portions 27 are part of the set face 21e of the guide 20. The inner peripheral faces of the retaining wall portions 27 are curved in accordance with the curved outer peripheral faces of the engagement pieces 30. As shown in FIG. 5, in the normal state where the outer peripheral toothed faces 30a of the engagement pieces 30 are meshed with the inner peripheral toothed face 12a of the ratchet 10, the inner peripheral faces of the retaining wall portions 27 are positioned on the outer side of the outer peripheral toothed faces 30a of the engagement pieces 30 in the radial direction and are apart from the outer peripheral toothed faces 30a of the engagement pieces 30.

When a load that is sufficient to cause the ratchet 10 and the guide 20 to be non-coaxial (to move the ratchet 10 relative to the guide 20 in the radial direction) is input in the reclining mechanism 4 in a certain radial direction, the retaining wall portion 27 that is arranged at the position in the certain direction receives the external toothed face 30a of the certain engagement piece 30 that approaches the retaining wall portion 27 due to the load, thereby preventing the ratchet 10 and the guide 20 from being non-coaxial. More specific description will be provided below. When the reclining mechanism 4 is in the lock state and the reclining angle of the seatback 2 is fixed, if a high load is suddenly input from the back of the occupant seated in the vehicle seat 1 into the seatback 2 due to a rear-end collision, a rotational force that may cause the ratchet 10 to rotate with respect to the guide 20 is input in the reclining mechanism 4 and a force that may cause the ratchet 10 and the guide 20 to be non-coaxial is input in the reclining mechanism 4 in the certain radial direction.

Figure 7:
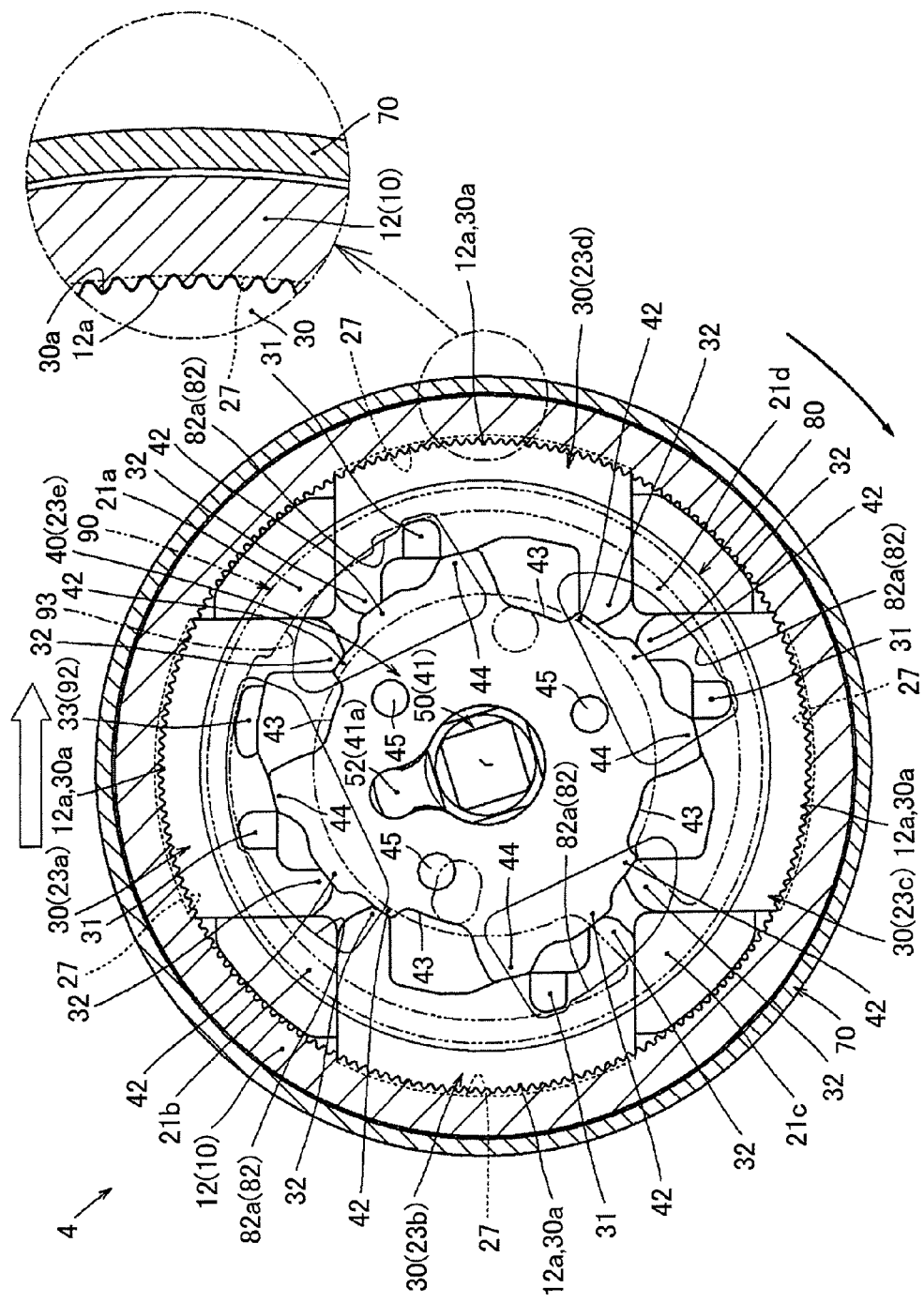
FIG. 7 is a cross-sectional view showing the reclining mechanism that has been shifted from the lock state in FIG. 5 to the state where a load that is sufficient to cause the ratchet and the guide to be non-coaxial is input in the reclining mechanism.

If the high load is input in the reclining mechanism 4 in the direction of the arrow in FIG. 7 (rightward, in FIG. 7), the ratchet 10 is pushed in the certain radial direction in which the high load is input in the reclining mechanism 4 and the inner peripheral toothed face 12a of the annular wall 12 is pushed against and supported by the outer peripheral faces of the guide blocks 21b and 21c of the guide 20. In this way, the guide blocks 21b and 21c of the guide 20 bear the high load input in the reclining mechanism 4. In addition, the right engagement piece 30 in FIG. 7, that is, the engagement piece 30 positioned in the direction in which the high load is input in the reclining mechanism 4, together with the other engagement pieces 30, is pushed rightward in FIG. 7 along with the ratchet 10 by a pushing force of the rotating cam 40. Thus, the outer peripheral toothed face 30a of the right engagement piece 30 is pushed against and supported by the inner peripheral face of the retaining wall portion 27. In this way, the retaining wall portion 27 bears the high load.

Further, the upper engagement piece 30 and the lower engagement piece 30 in FIG. 7, which are adjacent to the right engagement piece 30 in FIG. 7, are pushed rightward in FIG. 7, and the right side faces of the upper engagement piece 30 and the lower engagement piece 30 are pushed against and supported by the guide block 21a and the guide block 21d, respectively. In this way, the guide blocks 21a and 21d bear the high load. The threefold support structure described above reliably bears the force, which may cause the ratchet 10 and the guide 20 to be non-coaxial due to the high load input in the reclining mechanism 4.

For example, if a force that rotates the ratchet 10 with respect to the guide 20 in the clockwise direction in FIG. 7 is applied to the ratchet 10 due to the high load input in the reclining mechanism 4, the engagement pieces 30 that are meshed with the ratchet 10 are pushed against and supported by the guide blocks 21a to 21d that are adjacent to the respective engagement pieces 30 in the clockwise direction in FIG. 7. In this way, the guide blocks 21a to 21d bear the force that may rotate the ratchet 10 with respect to the guide 20.

In addition, a meshing force, which is generated when the outer peripheral toothed face 30a of the right engagement piece in FIG. 7 is pushed against the inner peripheral face of the retaining wall portion 27, acts as a braking force against the rotational force. When the left portions of the inner peripheral toothed face 12a of the ratchet 10 in FIG. 7 are pushed against the outer peripheral faces of the left guide blocks 21b and 21c of the guide 20 by the pushing force that may cause the ratchet 10 and the guide 20 to be non-coaxial and that is applied rightward in FIG. 7, a meshing force is generated. The meshing force acts as a braking force against the rotational force.

In the connector (reclining mechanism 4) for a vehicle seat according to the first embodiment, the inner peripheral face of the annular wall 12 of the ratchet 10, in which the inner peripheral toothed face 12a is formed, is supported from the inner peripheral side by the guide blocks 21a to 21d of the guide 20. With this structure, it is possible to increase the support strength with which ratchet 10 and the guide 20 are prevented from being non-coaxial without upsizing the reclining mechanism 4.

If the above-described high load is applied to the seatback 2 because an occupant seated in the backseat hits the back face of the seatback 2 due to a front-end collision, the high load is applied in the direction opposite to the direction of the arrow in FIG. 7 (leftward). Then, the left engagement piece 30 in FIG. 7 is pushed leftward, and the outer peripheral toothed face 30a of the left engagement piece 30 is pushed against the inner peripheral face of the retaining wall portion 27. In this way, the retaining wall portion 27 bears the high load.

Figure 9:
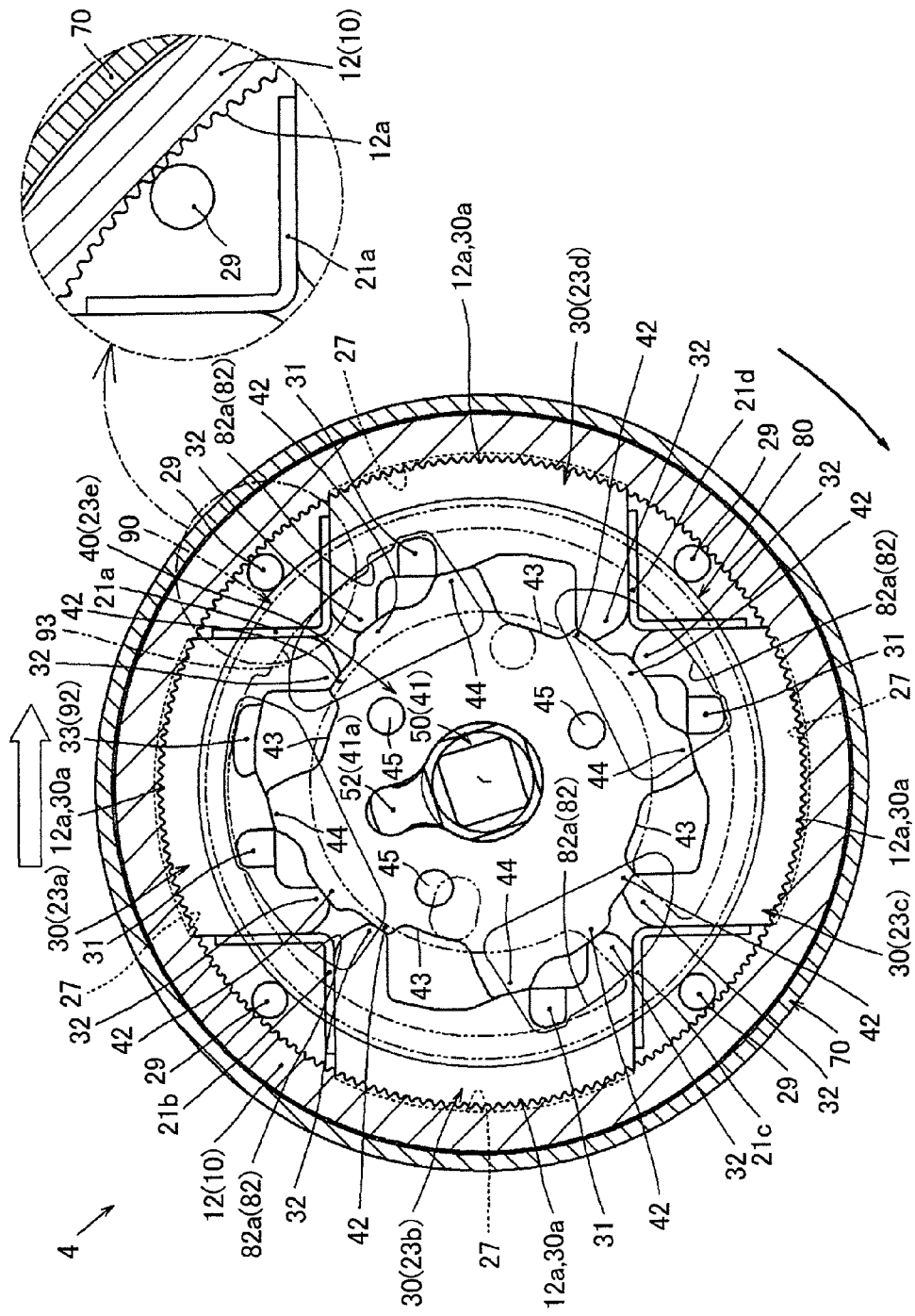
FIG. 9 is a cross-sectional view showing the structure of main portions of a reclining mechanism according to a second embodiment of the invention.

Next, the structure of a connector (reclining mechanism 4) for a vehicle seat according to a second embodiment of the invention will be described with reference to FIG. 9. The portions in the second embodiment that have substantially the same structures and effects as those of the connector (reclining mechanism 4) for a vehicle seat according to the first embodiment will be denoted by the same reference numerals, and description thereof will not be provided below. Only the portions that have distinctive features will be described below.

The reclining mechanism 4 according to the second embodiment differs from the reclining mechanism 4 according to the first embodiment in the support structure for supporting the inner peripheral face of the annular wall 12 of the ratchet 10. More specifically, in the second embodiment, the support structure is formed of support columns 29 that project in the axial direction and that are provided in the regions of the guide 20 which are apart from each other in the circumferential direction. In the first embodiment, the guide blocks 21a to 21d are formed in these regions.

According to the second embodiment, instead of the guide blocks 21a to 21d in the first embodiment, L-shaped plates 21a to 21d that are arranged so as to contact the side portions of the adjacent engagement pieces 30 are used. L-shaped plates 21a to 21d and the support columns 29 are separate members. The support columns 29 are arranged at positions between the engagement pieces 30 in the circumferential direction. Thus, it is possible to arrange the support columns 29 at positions more proximal to the outer periphery of the guide 20 without hindering the movements of the engagement pieces 30 to place the reclining mechanism 4 in the lock state or unlock state.

Figure 10:
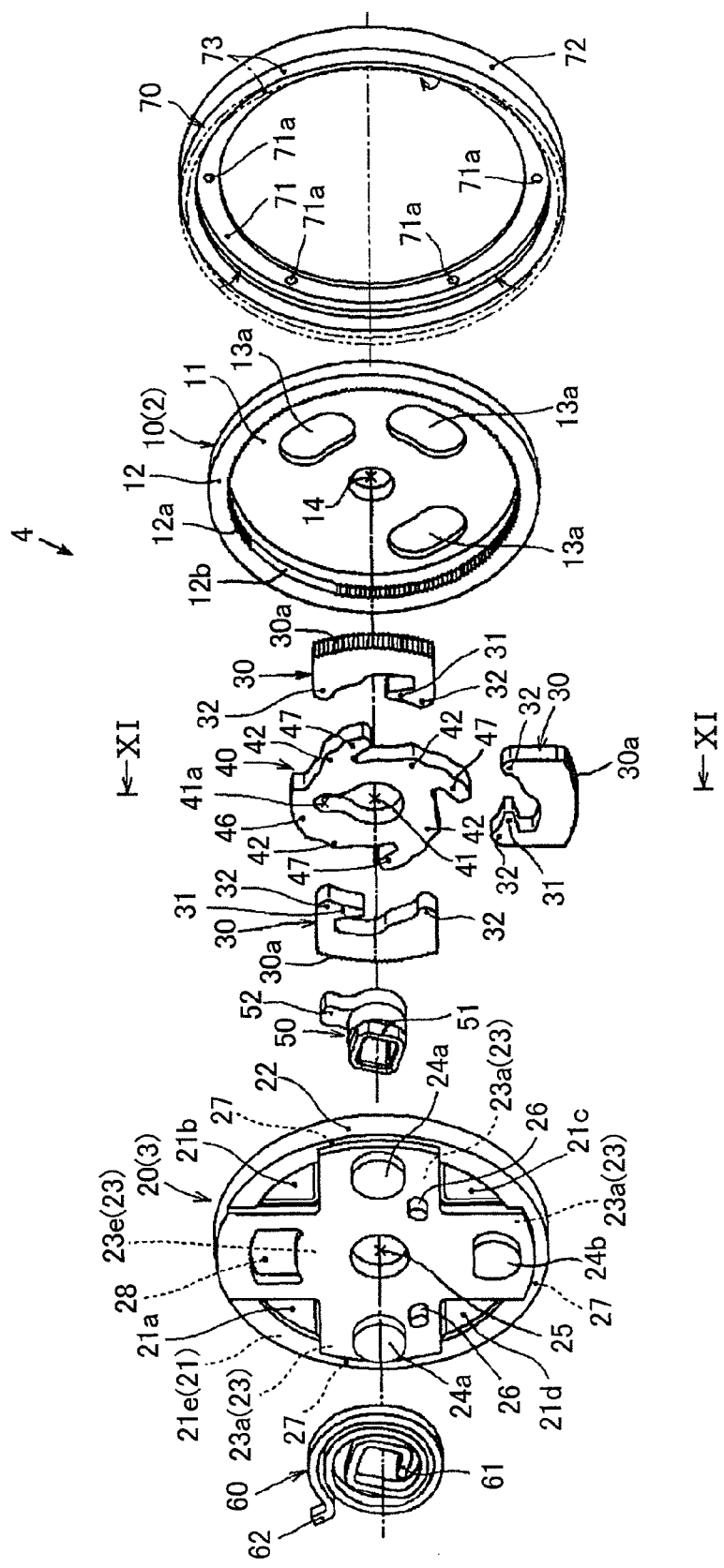
FIG. 10 is an exploded perspective view showing the structure of a reclining mechanism according to a third embodiment of the invention.

Next, the structure of a connector (reclining mechanism 4) for a vehicle seat according to a third embodiment of the invention will be described with reference to FIG. 10 to FIG. 12. The portions in the third embodiment that have substantially the same structures and effects as those of the connectors (reclining mechanisms 4) for a vehicle seat according to the first and second embodiments will be denoted by the same reference numerals, and description thereof will not be provided below. Only the portions that have distinctive features will be described below.

The reclining mechanism 4 according to the third embodiment differs from the reclining mechanism 4 according to the first embodiment in the structure for meshing the engagement pieces 30 with the ratchet 10. More specifically, the number of engagement pieces 30 is three in the third embodiment. In the third embodiment, the upper engagement piece 30 in FIG. 1 in the first embodiment is omitted. The three engagement pieces 30 are meshed with the ratchet 10.

Figure 11:
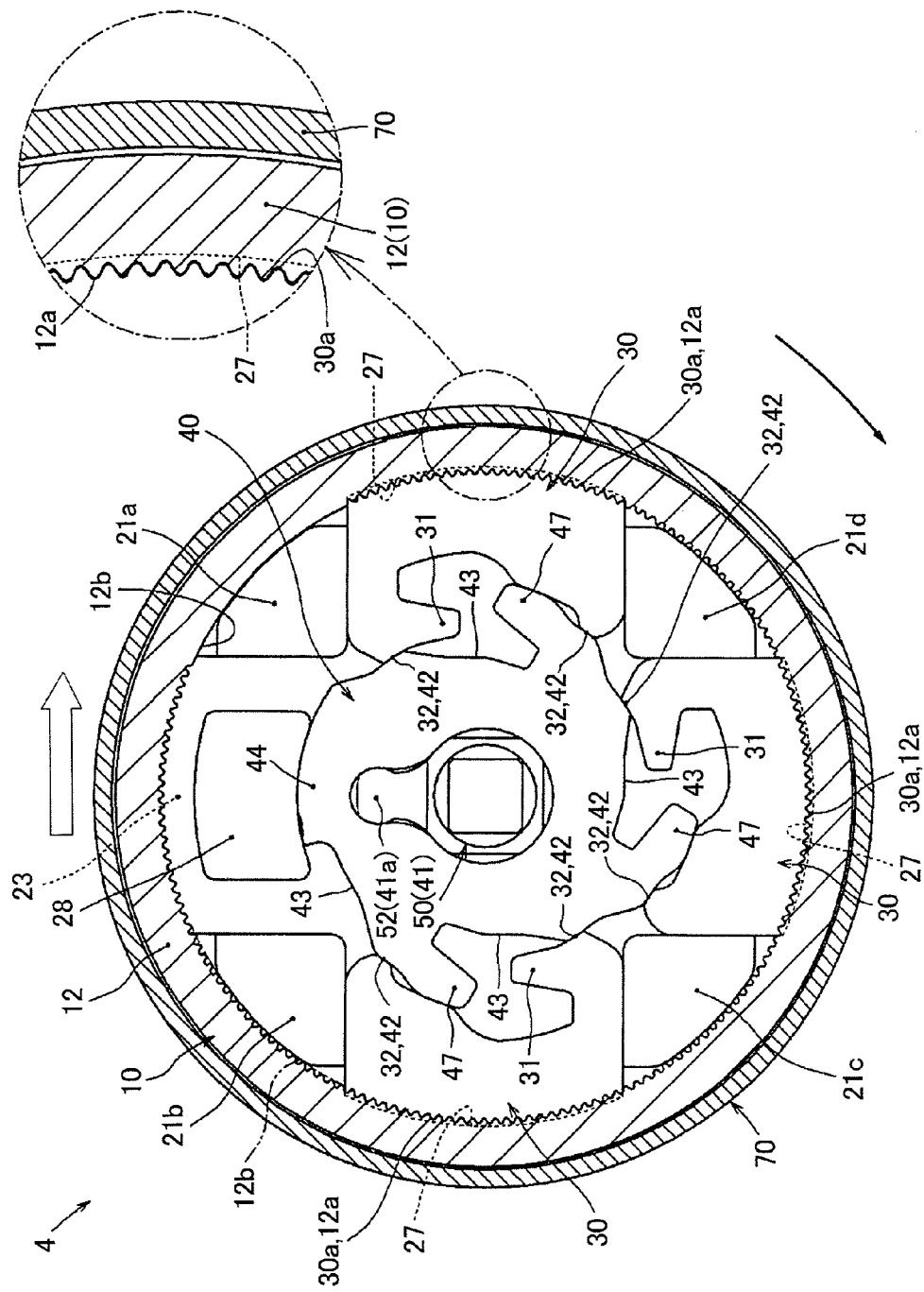
FIG. 11 is a cross-sectional view taken along the line XI-XI in FIG. 10, showing the reclining mechanism in the lock state.

Thus, in the upper rotation region in which there is no engagement piece 30, a reaction force against a pushing force with which the rotating cam 40 causes the engagement pieces 30 to mesh with the ratchet 10 is applied to the rotating cam 40 as a reaction force for pushing the rotating cam 40 upward in FIG. 11. Therefore, in the guide 20 according to the third embodiment, a receiving portion 28 that bears the upward pushing force applied to the rotating cam 40 is formed so as to project from the bottom face of the guide recess 23. A head portion 46 that contacts and is supported by the receiving portion 28 projects from the upper peripheral face of the rotating cam 40.

In addition, the reclining mechanism 4 according to the third embodiment differs from the reclining mechanism 4 according to the first embodiment in the structure for moving the engagement pieces 30 inward in the radial direction from the positions at which the engagement pieces 30 are meshed with the ratchet 10. More specifically, the reclining mechanism 4 according to the third embodiment is not provided with the release plate 80 (see FIG. 1) shown in the first embodiment. Instead, three arm-shaped hook portions 47 project outward in the radial direction from the outer peripheral face of the rotating cam 40.

Figure 12:
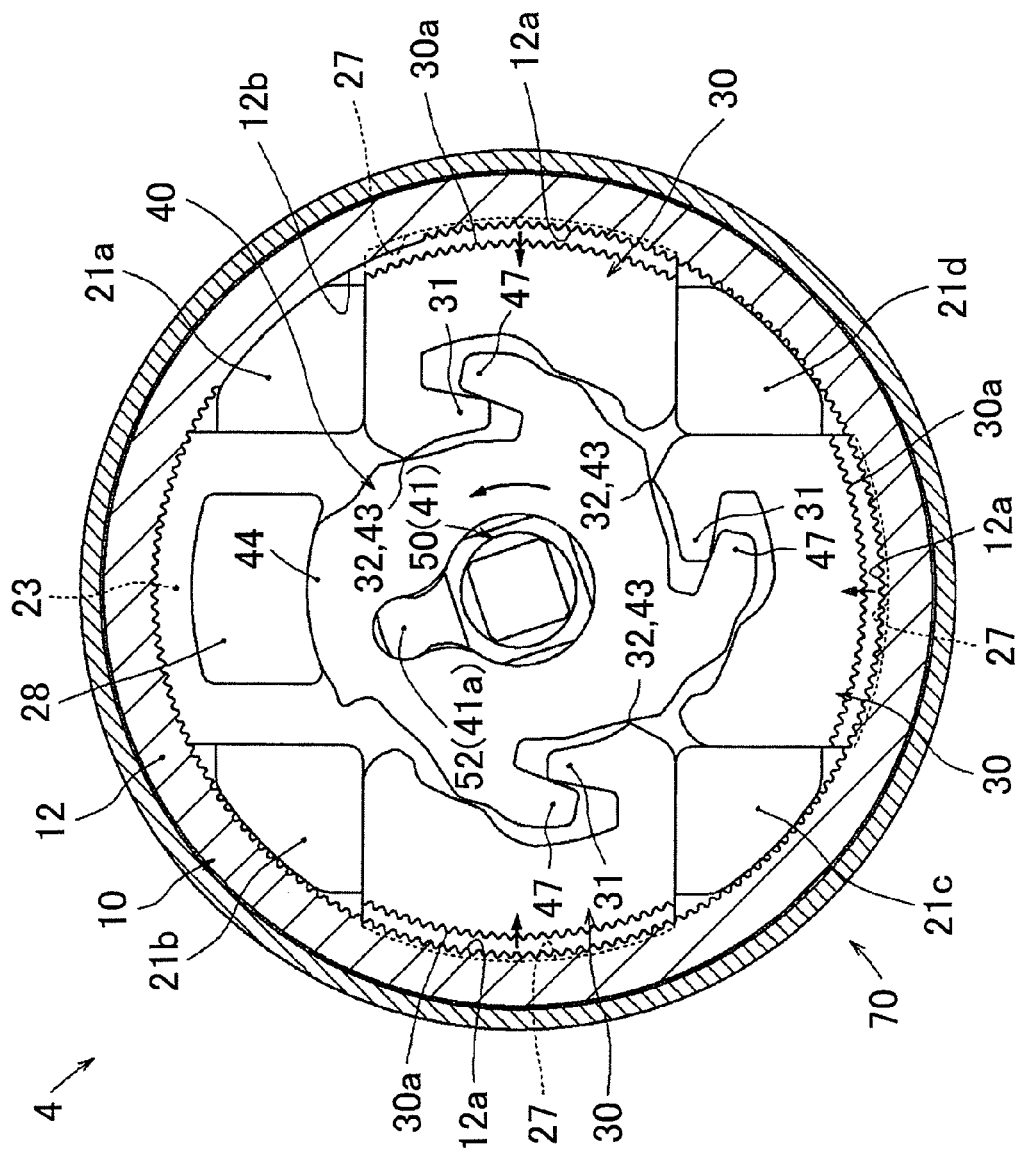
FIG. 12 is a cross-sectional view showing the reclining mechanism that has been shifted to the unlock state from the lock state in FIG. 11.

When the rotating cam 40 is rotated in the counterclockwise direction in FIGS. 11 and 12 from the lock state in FIG. 11 to state in FIG. 12, the hook portions 47 are hooked to hooking portions 31a that are formed in the engagement pieces 30 and move the engagement pieces 30 inward in the radial direction. The reclining mechanism 4 according to the third embodiment is not provided with the free zone plate 90 (see FIG. 1) that is provided in the first embodiment and that prevents the engagement pieces 30 from moving to place the reclining mechanism 4 in the lock state. Instead, a strand face 12b that is a strand smooth face having no teeth is formed in a portion of the inner peripheral face of the annular wall 12 of the ratchet 10.

The position of the strand face 12b in the radial direction is the same as the tooth tip of the inner peripheral toothed face 12a or slightly more inward than the tooth tip of the inner peripheral toothed face 12a. With this structure, even if the annular wall 12 of the ratchet 10 rotates, the strand face 12b interferes with none of the guide blocks 21a to 21d. Therefore, the inner peripheral face of the annular wall 12 is appropriately in contact with and supported by the outer peripheral faces of the guide blocks 21a to 21d from the inner peripheral side. Due to the rotation of the ratchet 10, the circumferential position of the strand face 12b is set to the position in the direction in which one of the engagement pieces 30 is moved to place the reclining mechanism 4 in the lock state. Thus, the engagement piece 30 directly strands the strand face 12b and the engagement piece 30 is prevented from being further moved to place the reclining mechanism 4 in the lock state.

In the reclining mechanism 4 according to the third embodiment, when the strand face 12b passes through the upper rotational angle range in FIGS. 11 and 12, which is between the right engagement piece 30 and the left engagement piece 30, the lock zone is formed. Because there is no engagement piece 30 within this range, the lock zone is wide.

Figure 13:
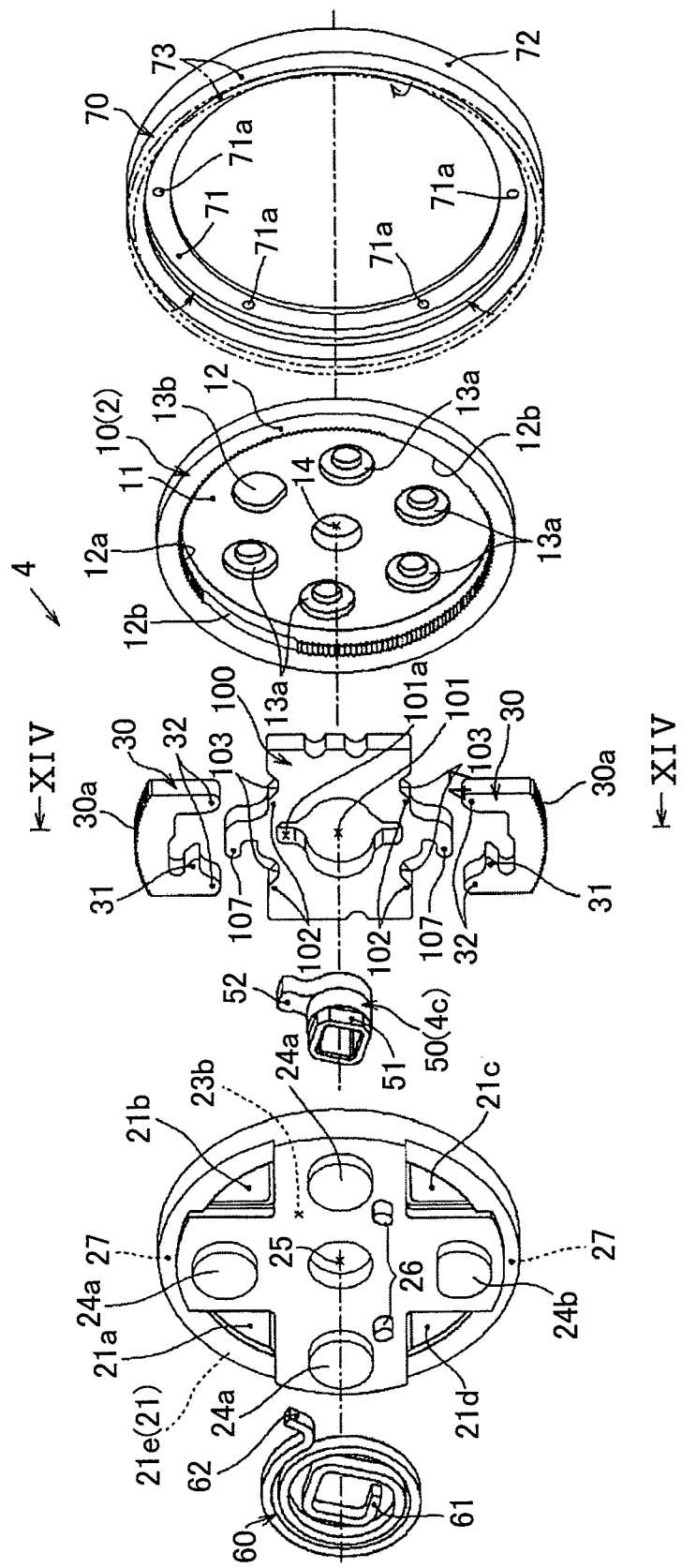
FIG. 13 is an exploded perspective view showing the structure of a reclining mechanism according to a fourth embodiment of the invention.

Next, the structure of a connector (reclining mechanism 4) for a vehicle seat according to a fourth embodiment of the invention will be described with reference to FIG. 13 to FIG. 15. The portions in the fourth embodiment that have substantially the same structures and effects as those of the connectors (reclining mechanisms 4) for a vehicle seat according to the first to third embodiments will be denoted by the same reference numerals, and description thereof will not be provided below. Only the portions that have distinctive features will be described below.

The reclining mechanism 4 according to the fourth embodiment differs from the reclining mechanism 4 according to the first embodiment in the structure for meshing the engagement pieces 30 with the ratchet 10. More specifically, the number of engagement pieces 30 is two in the fourth embodiment. In the fourth embodiment, the right and left engagement pieces 30 in FIG. 1 in the first embodiment are omitted. The two engagement pieces 30 are meshed with the ratchet 10. These engagement pieces 30 are apart from each other in the circumferential direction in such a manner that the outer peripheral toothed face 30a of one of the engagement pieces 30 faces the front of the vehicle and the outer peripheral toothed face 30a of the other engagement piece 30 faces the rear of the vehicle.

In the reclining mechanism 4 according to the fourth embodiment, the engagement pieces 30 are moved inward in the radial direction by a sliding motion of a slide cam 100 that is provided at the center portion of the guide 20, instead of the rotating cam 40 in FIG. 1 in the first embodiment. As shown in FIGS. 14 and 15, the slide cam 100 is slidable only in the up-down direction in FIGS. 14 and 15 along the cam recess 23e that is formed of the center portion and the recessed portion that extend in the up-down direction, which are included in the cross-shaped guide recess 23 that is a recess formed in the guide 20.

Figure 14:
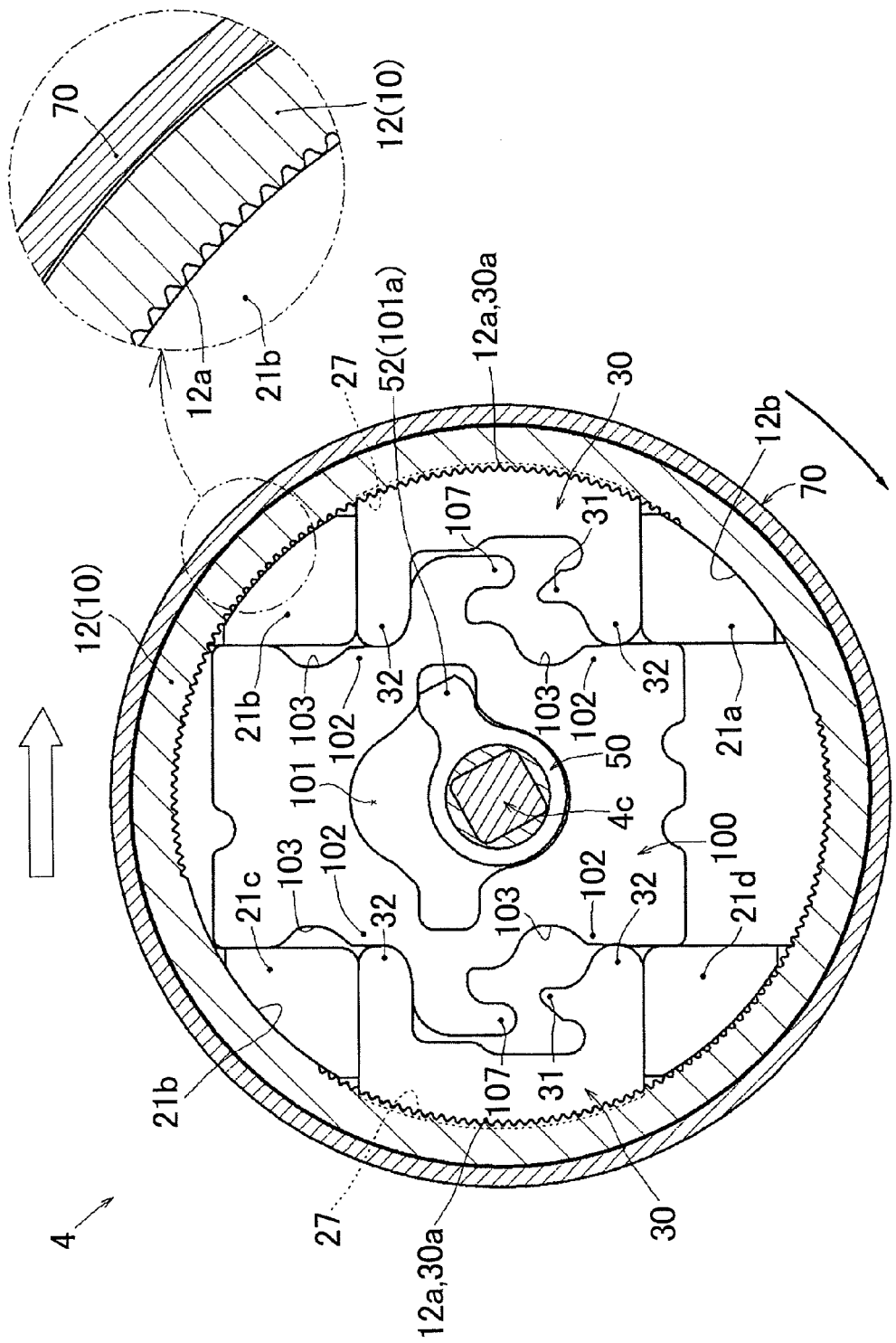
FIG. 14 is a cross-sectional view taken along the line XIV-XIV in FIG. 13, showing the reclining mechanism in the lock state.

As shown in FIG. 14, the slide cam 100 is usually maintained in the state in which the slide cam 100 has been slid upward in FIG. 14, because the hinge cam 50 fitted in a through-hole 101 formed at the center portion of the slide cam 100 is rotated in the counterclockwise direction in FIG. 14 by a biasing force of the spiral spring 60 and an operation-hole portion 101a is pushed by the operation projection 52 of the hinge cam 50. With this operation, the leg portions 32 of the engagement pieces 30 strand shoulder portions 102 that project from the right and left side portions of the slide cam 100, and the engagement pieces 30 are pushed outward in the radial direction so that the engagement pieces 30 are meshed with the inner peripheral toothed face 12a of the ratchet 10.

Figure 15:
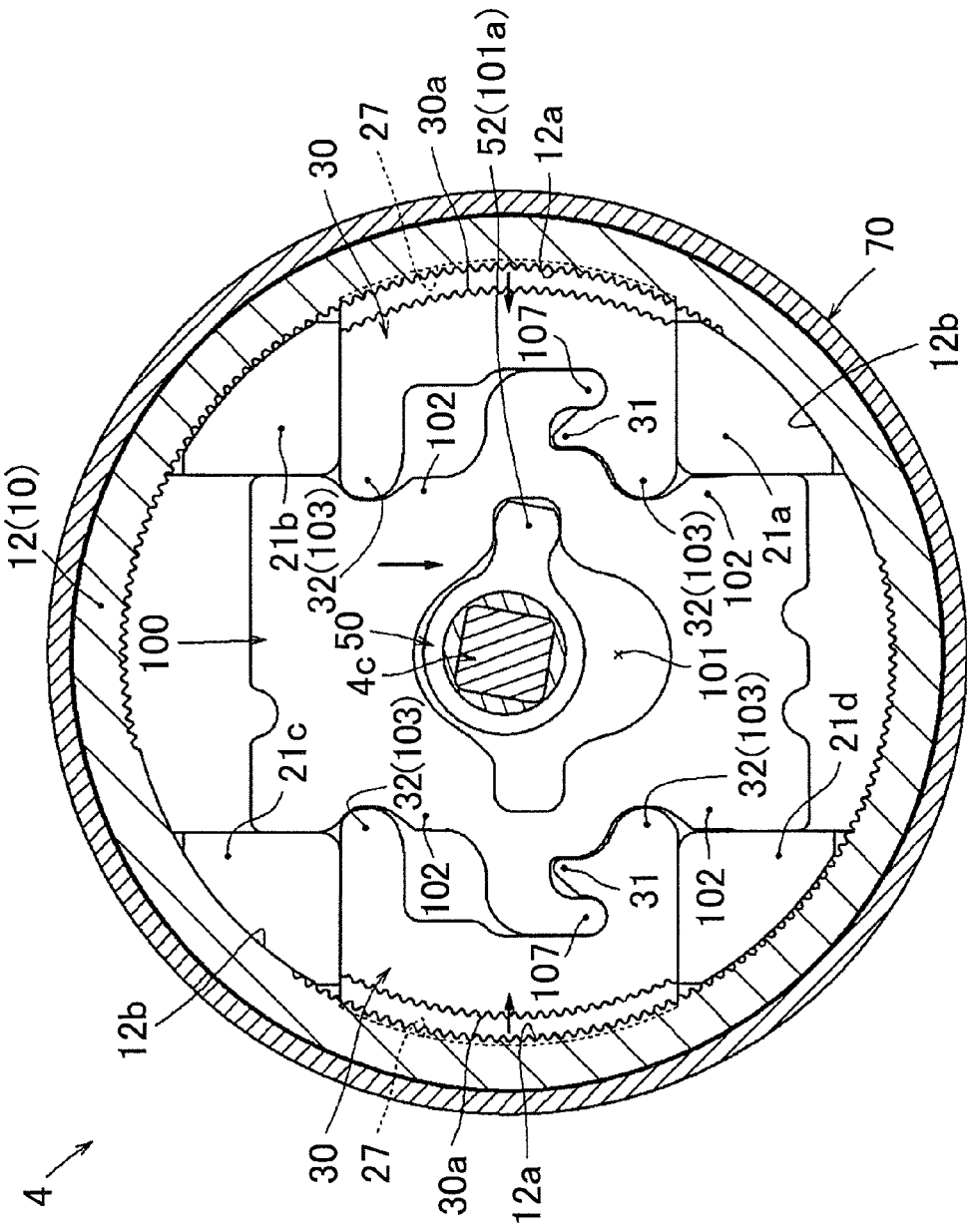
FIG. 15 is a cross-sectional view showing the reclining mechanism that has been shifted to the unlock state from the lock state in FIG. 14.

As shown in FIG. 15, when the hinge cam 50 is rotated in the clockwise direction, hook portions 107 that project from the right and left side portions of the slide cam 100 are hooked to the hooking portions 31 formed in the engagement pieces 30, and the slide cam 100 moves the engagement pieces 30 inward in the radial direction. Thus, the leg portions 32 of the engagement pieces 30 are introduced into recessed portions 103 formed adjacent to the shoulder portions 102 of the slide cam 100, and the engagement pieces 30 are disengaged from the ratchet 10.

In the reclining mechanism according to the fourth embodiment, as in the third embodiment, when the outer peripheral toothed faces 30a of the engagement pieces 30 strand the strand faces 12b that are formed in the inner peripheral face of the annular wall 12 of the ratchet 10, the reclining mechanism 4 is prevented from being placed in the lock state. As in the third embodiment, the position of each strand face 12b in the radial direction is the same as the tooth tip of the inner peripheral toothed face 12a or slightly more inward than the tooth tip of the inner peripheral toothed face 12a. With this structure, even if the annular wall 12 of the ratchet 10 rotates, the strand faces 12b interfere with none of the guide blocks 21a to 21d. Therefore, the inner peripheral face of the annular wall 12 is appropriately in contact with and supported by the outer peripheral faces of the guide blocks 21a to 21d from the inner peripheral side.

The four embodiments of the invention have been described above. However, the invention may be implemented in various other embodiments. For example, in the above-described embodiments, the connector for a vehicle seat according to the invention is implemented as the reclining mechanism 4 that connects the seatback 2 to the seat cushion 3 in such a manner that the reclining angle of the seatback 2 is adjustable. However, the connector according to the invention may be used in a case where a tilt seatback is connected to a floor of a vehicle body.

The connector may be used in a case where a seat body is connected to a floor of a vehicle body in such a manner that the seat body may be swiveled with respect to the floor. Further, the connector may be used in a case where a so-called ottoman device that lifts up and supports the lower legs of an occupant from below is connected to a seat cushion or a floor of a vehicle body in such a manner that the ottoman device is tiltable with respect to the seat cushion or the floor.

Any one of the ratchet (second connection disc member) and the guide (first connection disc member) in the embodiments described above may be connected to the seatback-side (movable) member. In addition, any one of the ratchet (second connection disc member) and the guide (first connection disc member) in the embodiments described above may be connected to the fixed member, for example, the seat cushion or the floor. In the embodiments described above, the engagement pieces (lock members) are slid linearly in the radial direction to place the reclining mechanism 4 in the lock state or the unlock state. Alternatively, the engagement pieces 30 may be moved in another manner, for example, moved in the circumferential direction, to place the reclining mechanism 4 in the lock state or the unlock state.

The engagement pieces may be moved inward in the radial direction with the use of the release plate as described in the first and second embodiments. Alternatively, the engagement pieces may be moved inward in the radial direction directly by the rotating cam or the slide cam, as described in the third and fourth embodiments. In the embodiments described above, the ratchet (second connection disc member) and the guide (first connection disc member) have a disc-shape. Alternatively, the ratchet and the guide may be in another form. For example, extension portions that extend from the disc members in the radial direction or the axial direction may be connected to the seatback or the frame member (connected member) of the seat cushion.

The number of engagement pieces that are arranged between the ratchet and the guide is not particularly limited, and may be any one of one to four. In the second embodiment, the annular-wall support portions that are in contact with the inner peripheral toothed face of the ratchet are separate from the L-shaped plates. In this case, the shape of the annular-wall support portion is not limited to a column shape. Any curved member that smoothly guides the inner peripheral toothed face of the ratchet may be used as the annular-wall support portion.

What is claimed is:

1. A connector for a vehicle seat used to connect a first connected member and a second connected member to each other in such a manner that the first connected member and the second connected member are pivotable with respect to each other, comprising:

a first connection disc member and a second connection disc member that are connected integrally with the first connected member and the second connected member, respectively, and that are coaxially fitted together in such a manner that the first connection disc member and the second connection disc member are rotatable with respect to each other; and at least one lock member that is arranged between the first connection disc member and the second connection disc member, that is fitted to the first connection disc member and supported so as to be movable in a radial direction of the first connection disc member, and that is moved outward in the radial direction so that an outer peripheral toothed face of the at least one lock member meshes with an inner peripheral toothed face of the second connection disc member, thereby preventing relative rotation between the first connection disc member and the second connection disc member, wherein the second connection disc member has a disc portion and an annular wall that is formed on an outer periphery of the disc portion, that extends in an axial direction of the second connection disc member, and that has an inner peripheral face in which the inner peripheral toothed face is formed, the first connection disc member has multiple annular-wall support portions that project from an inner disc face of the first connection disc member, which faces the second connection disc member, in an axial direction of the first connection disc member, the first connection disc member has a recess that projects from the inner disc face in a direction opposite the axial projecting direction of the multiple annular-wall support portions, the recess being configured to accommodate the at least one lock member, and the inner peripheral face of the annular wall of the second connection disc member is in contact with and supported by the annular-wall support portions.

2. The connector according to claim 1, wherein the first connection disc member has multiple retaining wall portions, each retaining wall portion being defined by an outer circumferential portion of the inner disc face at an outer side of the recess in the radial direction between each of the multiple annular-wall support portions, and having an inner peripheral face curved and configured to accommodate the outer peripheral toothed face of the at least lock member so that when a force acts on the connector while in a locked state, the retaining wall portions support the at least one lock member and prevent mis-alignment of the first connection disc member and the second connection disc member.

3. The connector according to claim 2, wherein when the lock member meshes with the inner peripheral toothed face of the second connection disc member, the inner peripheral faces of the retaining wall portions are on an outer side of the outer peripheral toothed face of the lock member in the radial direction, and apart from the outer peripheral toothed face of the lock member.

4. The connector according to claim 2, wherein the annular-wall support portions of the first connection disc member are formed on both sides of a position, at which the lock member is arranged, in the circumferential direction.

5. The connector according to claim 4, wherein the annular-wall support portions are formed of curved outer peripheral faces of block portions that are formed on respective sides of the lock member, that project from the inner disc face of the first connection disc member, and that support the lock member.

6. The connector according to claim 5, wherein the lock member is in contact with the block portions.

7. The connector according to claim 4, wherein each of the annular-wall support portions is a projection that guides the inner peripheral toothed face of the second connection disc member.

8. The connector according to claim 7, wherein each of the annular-wall support portions is a column member.

9. The connector according to claim 8, wherein the first connection disc member has L-shaped plates that are in contact with and support the lock member.

10. The connector according to claim 1, wherein the annular-wall support portions of the first connection disc member are formed on both sides of a position, at which the lock member is arranged, in the circumferential direction.

11. The connector according to claim 10, wherein the annular-wall support portions are formed of curved outer peripheral faces of block portions that are formed on respective sides of the lock member, that project from the inner disc face of the first connection disc member, and that support the lock member.

12. The connector according to claim 11, wherein the lock member is in contact with the block portions.

13. The connector according to claim 10, wherein each of the annular-wall support portions is a projection that guides the inner peripheral toothed face of the second connection disc member.

14. The connector according to claim 13, wherein each of the annular-wall support portions is a column member.

15. The connector according to claim 14, wherein the first connection disc member has L-shaped plates that are in contact with and support the lock member.

* * * * *

UNITED STATES PATENT AND TRADEMARK OFFICE
CERTIFICATE OF CORRECTION

PATENT NO. : 8,297,704 B2
APPLICATION NO. : 12/623690
DATED : October 30, 2012
INVENTOR(S) : T. Endo et al.

Page 1 of 1

It is certified that error appears in the above-identified patent and that said Letters Patent is hereby corrected as shown below:

In the Claims

At column 17, line 24 (claim 2, line 8) of the printed patent, please insert --one-- after the word least.

Signed and Sealed this
Ninth Day of April, 2013

Teresa Stanek Rea
*Acting Director of the United States Patent and Trademark Office*